US 7,421,451 B2

(12) United States Patent　　　(10) Patent No.: US 7,421,451 B2
Albert et al.　　　(45) Date of Patent: Sep. 2, 2008

(54) PADDING MANAGEMENT FOR CONTENT FILES

(75) Inventors: David Albert, Woodinville, WA (US);
Eric S. Vandenberg, Seattle, WA (US);
Richard Shailer Turner, Jr.,
Woodinville, WA (US); Robert A. Wlodarczyk, Redmond, WA (US);
Thomas W. Olsen, Issaquah, WA (US);
Tomasz S. M. Kasperkiewicz,
Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 403 days.

(21) Appl. No.: 11/214,636

(22) Filed: Aug. 30, 2005

(65) Prior Publication Data
US 2007/0050321 A1　　Mar. 1, 2007

(51) Int. Cl.
*G06F 17/30* (2006.01)
(52) U.S. Cl. .................. 707/102; 707/101; 707/104.1
(58) Field of Classification Search .................. 707/1, 707/2, 101, 102, 104.1; 710/11; 717/122
See application file for complete search history.

(56) References Cited

U.S. PATENT DOCUMENTS

| 5,717,951 A * | 2/1998 | Yabumoto ..................... 710/11 |
| 6,629,104 B1 * | 9/2003 | Parulski et al. .............. 707/102 |
| 2002/0091665 A1 * | 7/2002 | Beek et al. ..................... 707/1 |
| 2004/0001631 A1 * | 1/2004 | Camara et al. .............. 382/224 |
| 2005/0071744 A1 * | 3/2005 | Dunbar et al. ........... 715/500.1 |
| 2006/0136875 A1 * | 6/2006 | Thorpe ....................... 717/122 |

* cited by examiner

*Primary Examiner*—Shahid Alam
*Assistant Examiner*—Phong Nguyen
(74) *Attorney, Agent, or Firm*—Workman Nydegger

(57) ABSTRACT

Described is the adding of padding to a content file (e.g., image and/or audiovisual file) for anticipated subsequent use such that the content file need not be re-encoded to add metadata and other data to it. For example, padding may be added to an image file directly after an image file directory, whereby the directory can grow as needed into the padded space. Metadata can likewise be added to the padding, e.g., from the opposite direction that the directory extends into the padding. The padding may be added on the first re-encoding of the file, reducing or eliminating the need for subsequent re-encoding. The padding also may be used to track dead space in the file, with adjacent regions of dead space coalesced into a single region of dead space.

18 Claims, 12 Drawing Sheets

PADDING MANAGEMENT FOR CONTENT FILES

BACKGROUND

Digital image files including still images contain metadata that are used to store useful information about an image. For example, an image may contain metadata that identifies the author, copyright information, keywords to identify with the image, a caption and so forth. An image file is logically organized into blocks, which may contain the encoded image data or metadata, i.e., metadata comprises information about the image data. A particular set of blocks may be organized in a directory, which is referred to as image file directory.

U.S. patent application Ser. No. 11/062,267, assigned to the assignee of the present invention, describes an extensible metadata architecture for digital images (as well as multimedia content in general). The extensible metadata architecture provides an abstraction layer of the metadata content within an image by which application programs can read and write metadata items.

A problem occurs when an application program attempts to write a metadata item when there is insufficient space within the metadata structure to accommodate the metadata item. One solution is to re-encode the image file to add the metadata item. However, re-encoding an image file is very costly in terms of time and/or resource consumption.

SUMMARY

Briefly, various aspects of the present invention are directed towards adding padding to a content file (e.g., image and/or audiovisual file) and then writing the padded content file to persistent storage. For example, padding may be added to an image file (logically organized into metadata blocks) directly after an image file directory (particular metadata blocks organized as a directory of metadata items), whereby the image file directory can grow as needed into the padded space. Metadata can likewise be added to the padding, e.g., from the opposite direction that the directory extends into the padding. The padding may be added on the first re-encoding of the file, reducing or eliminating the need for subsequent re-encoding. The padding also may be used to track dead space in the file, with adjacent regions of dead space coalesced into a single region of dead space.

Upon obtaining metadata to add to an image file, the image file may be evaluated to determine whether a sufficient dead space region exists in the image file to hold the metadata, and if so, the metadata added to the dead space region, such as to a selected region that wastes the least amount of space. If no sufficient dead space region exists, the metadata may be added to the padding region, if sufficient. Only when both the dead space and padding space is insufficient for holding the metadata is the file re-encoded for the purpose of adding metadata.

A metadata handler component that processes an image file is coupled to (e.g., includes or is otherwise associated with) a padding management component that produces a padded image file from an original image file (or a re-encoded image file). When subsequently opened, e.g., for editing, the padding management component can add metadata to a location corresponding to the padding, can add an image file directory entry to a location corresponding to the padding and/or can track dead space in a location corresponding to the padding.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
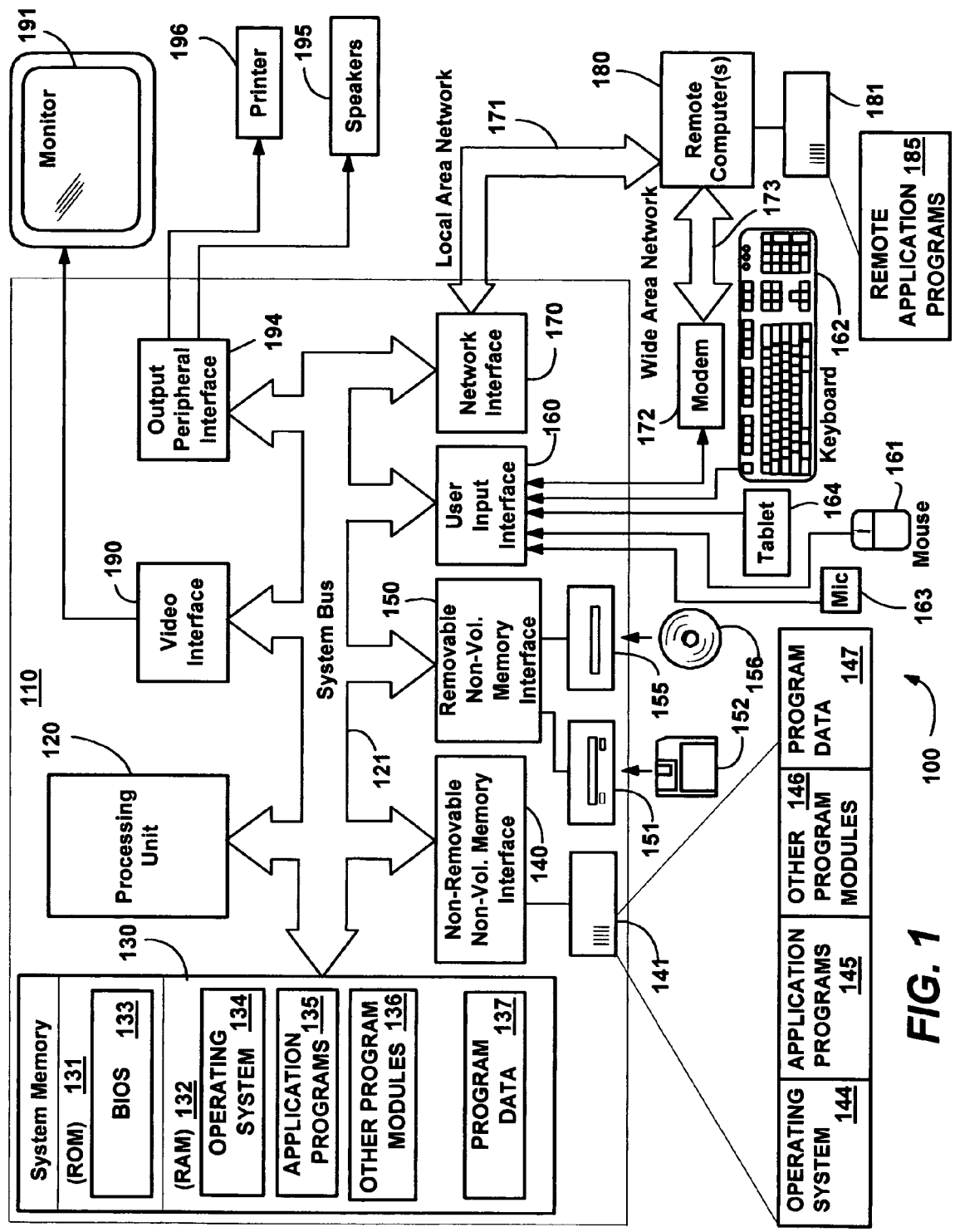
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Padding Management

Various aspects of the technology described herein are directed towards extending, or padding, the amount of space to which metadata associated with a digital image may be written. Typically, this occurs the first time supplemental metadata is added when there is insufficient space for it, requiring the digital image file to be re-encoded, whereby padding, comprising unused space for anticipated future use, may be added. However, as will be understood, the present invention is not limited to still digital images, but will work with any type of content in general, such as multimedia content including, without limitation, a digital image or digital video, any type of audio content including without limitation digital music, or a combination of video and audio content. As such, any of the examples mentioned herein are non-limiting, and the present invention may be used various ways that provide benefits and advantages in computing in general.

Figure 2:
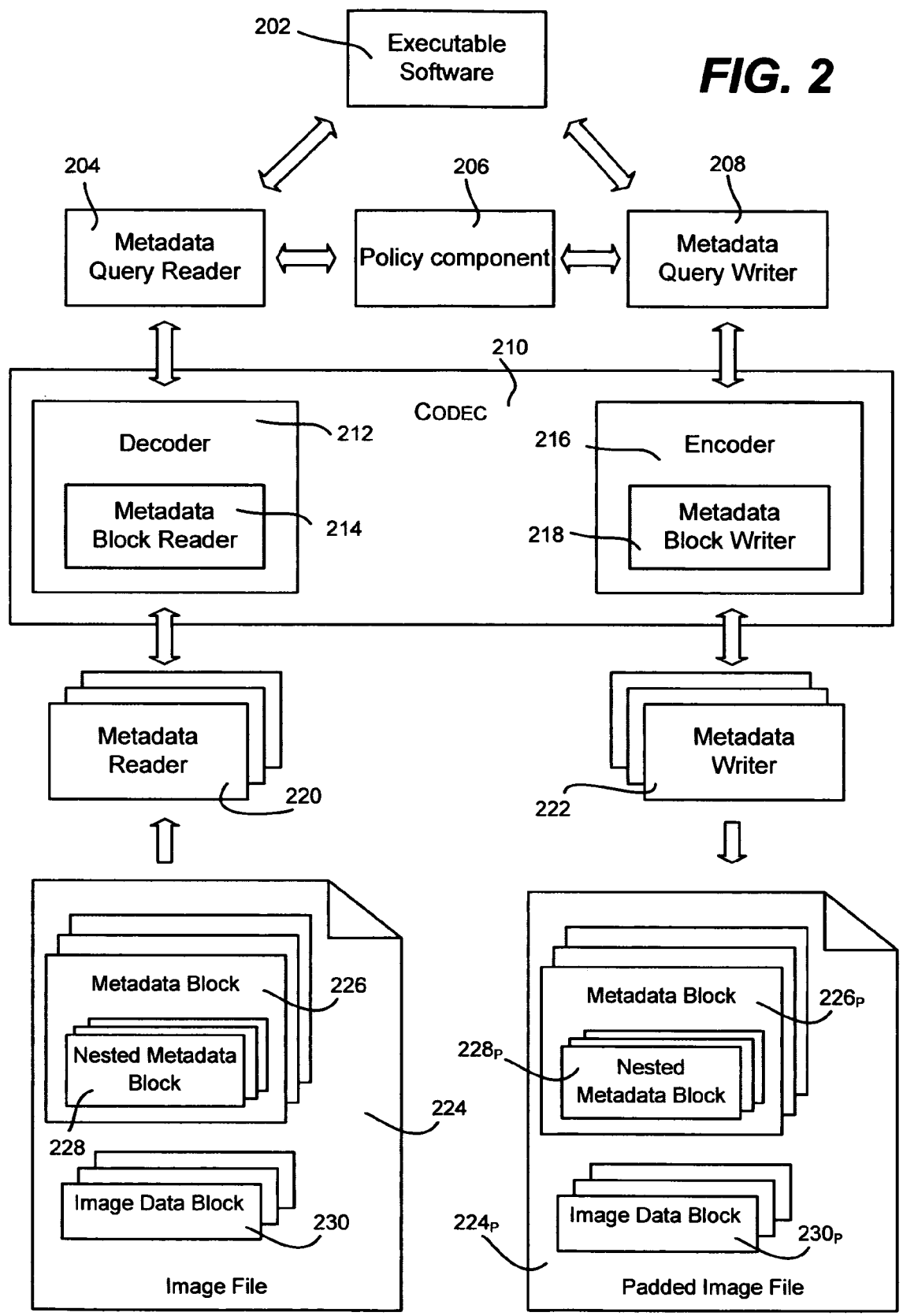
FIG. 2 is a block diagram generally representing an exemplary architecture of system components in an example embodiment of an extensible metadata architecture for digital images.

Turning to FIG. 2 of the drawings, there is shown a block diagram generally representing an exemplary architecture of components for handling image-related metadata, where as used herein, metadata may mean data describing attributes of content, such as in an image file. Some examples of image-related metadata include, without limitation, author, creation date, width, height, lens data, shutter speed, caption, keywords, textual descriptions and so forth.

Various metadata and types of metadata may be added to image files, and new metadata readers and writers may be added as needed for decoding and encoding metadata. To this end, one or more metadata block readers may be associated with a metadata block within an image file; a metadata block reader may be associated with one or more metadata blocks. A metadata block, may mean a collection of one or more metadata items that may or may not be related. For example, some imaging formats may specify a collection of metadata items each represented by a keyword and value pair.

One or more metadata block writers may be associated with a metadata block to be written to an image file; a metadata block writer may be associated with one or more metadata blocks. One way to add, delete or modify metadata is via in-place editing of the metadata, without the need to use a separate image stream for writing modified metadata to an image file.

As represented in FIG. 2, executable software 202 may perform any number of operations with an image file, including reading metadata from and writing metadata to the image file. The executable software 202 may be operably coupled to a metadata query reader 204 for requesting metadata to be read from an image file and may be operably coupled to a metadata query writer 208 for requesting metadata to be written to an image file. In one implementation, the metadata query reader 204 and the metadata query writer 208 may provide suitable application programming interfaces (APIs) that may be invoked by the executable software 202 to request that metadata to be respectively read from and written to an image file, e.g., based on a query language. A policy component 206 may also be operably coupled to the metadata query reader 204 and to the metadata query writer 208 for resolving non-fully qualified queries for a metadata item in a non-specified location within the file. The executable software 202, the metadata query reader 204, the metadata query writer 208 and the policy component 206 may each be any executable software code including an application program or application component, a component of a linked library, an object, and so forth.

A codec, such as codec 210, may be provided for each type of image file supported by the computer system. For example, there may be a codec for GIF, JPEG, PNG, TIFF, and other image file formats. The metadata query reader 204 may also be operably coupled to a decoder 212 of a codec 210 and the metadata query writer 208 may also be operably coupled to an encoder 216 of the codec 210. Each codec may include or otherwise be associated with the decoder 212 for decoding an image and the encoder 216 for encoding an image. The decoder 212 may include a metadata block reader 214 that may be operably coupled to one or more metadata readers 220.

The metadata block reader 214 may identify recognizable metadata blocks 226 within an image file 224. Each metadata reader 220 may then provide functionality for parsing a type of metadata block recognized within an image file. Different types of metadata schema/tags used to describe an image file include Exif, IPTC and XMP. A decoder may thus read metadata in an image file 224 by using the metadata block reader 214 to identify recognizable metadata blocks within the image file 224 and then may use the same or a different metadata reader to decipher the metadata items in each metadata block. In various embodiments, the decoder 212 may also use one or more metadata readers to parse a metadata block 226 that may include nested metadata blocks 228. Either the same or a different metadata reader may be used to decipher the metadata items in each nested metadata block. In this way, a decoder may provide metadata items requested by a metadata query reader for an executable.

An encoder 216 may include a metadata block writer 218 that may be operably coupled to one or more metadata writers 222. The metadata block writer 218 may identify and add a metadata writer 222 for each metadata block 226 to be written within an image file, which as described below, may be a padded image file 224$_P$. Each metadata writer 222 may then provide functionality for writing metadata items for a type of metadata block to be written within an image file. In one embodiment, an encoder may thus write metadata in an image file by using the metadata block writer to identify and add metadata writers for each metadata block to be written in the image file. Thus, an encoder may write metadata items requested by an executable using a metadata query writer.

The metadata reader 220 and the metadata writer 222 may be operably coupled to an image file 224 that may include metadata blocks 226 and image data blocks 230. A metadata block 226 may include one or more nested metadata blocks 228. In one embodiment, a metadata block may include a nested metadata block for a different type of image than the metadata block. Each nested metadata blocks may also include, in turn, one or more nested metadata blocks so that metadata blocks may be nested for any number of levels. Correspondingly, a metadata reader may be associated with each metadata block within a hierarchy of nested metadata blocks.

Note that the metadata architecture shown in FIG. 2 is but one exemplary embodiment; other configurations may be used to implement the present invention. For example, a fast metadata writer may be implemented by using a metadata block reader to read metadata blocks from an image file and then using a metadata block writer to perform in-place editing of metadata items in a metadata block for writing back to the image file. In another example, executable software code may instantiate a metadata block reader, a metadata block writer, a metadata reader, and/or a metadata writer for performing operations on metadata in an image file without need of a decoder and/or encoder.

Figure 3:
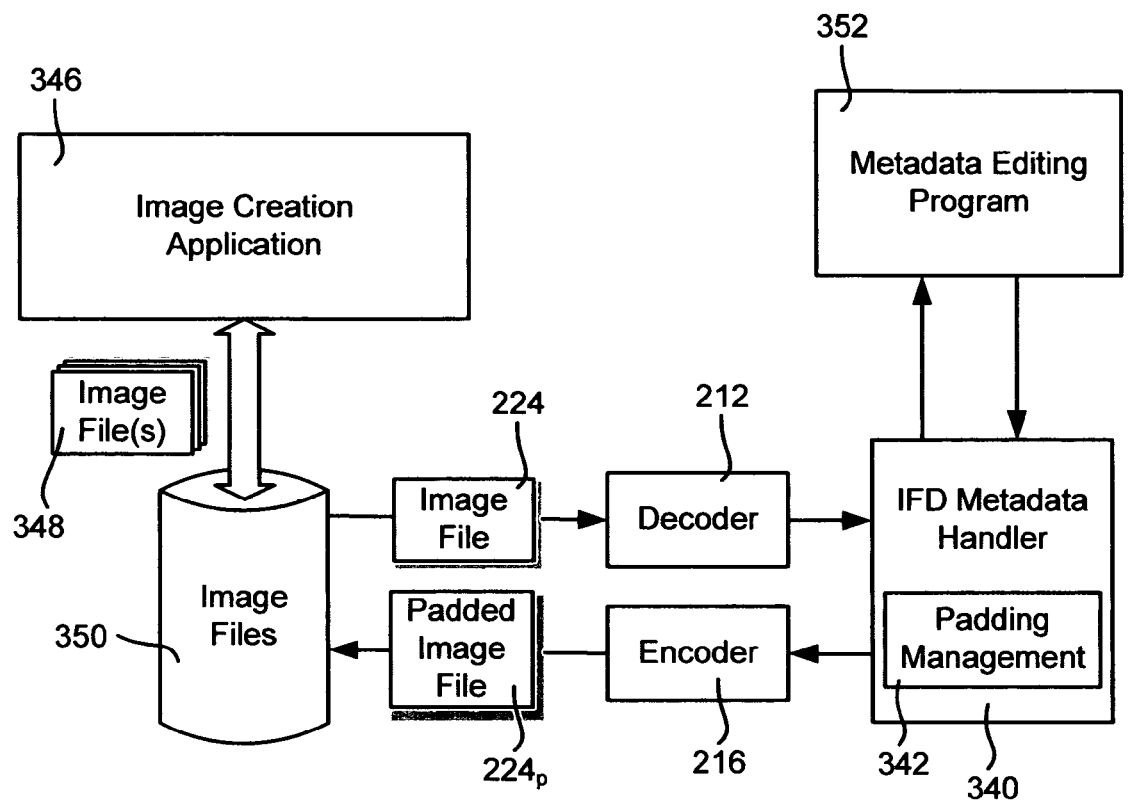
FIG. 3 is an example representation of an image file being processed to add padding.

FIG. 3 is a representation of an example architecture for padding an image file to provide additional space for metadata to be written without the need for re-encoding the entire image file on subsequent edits. For purposes of simplicity, FIG. 3 shows a single block as an image file directory (IFD) metadata handler 340, e.g., for handling the reading and/or writing of metadata. The IFD metadata handler 340 is shown as including a padding management mechanism 342 (e.g., including logic). Note that the use of an IFD and IFD metadata handler 340 is only for example purposes, and that padding also works with other file and/or metadata formats.

In general, in FIG. 3, some image creation application program 346 (which may include camera software) creates one or more image files 348. Those image files 348 are added to a storage mechanism 350, either directly by the creation program or indirectly by copying from another medium. Some time later, a metadata editing program 352 requests (e.g., via a query or the like) to read from or write to the metadata of a selected image file, e.g., the image file 224 of FIG. 2. When editing (adding or modifying) metadata, re-encoding may be necessary in order to fit the metadata into the image file. Typically, if more metadata is present than at the time of creation, re-encoding is necessary.

In accordance with various aspects of the present invention, upon re-encoding, the IFD metadata handler 340 adds padding, essentially extra space, to the image file for anticipated use with subsequent metadata and other data, thereby encoding a padded image file $224_p$. One concept is to reduce or eliminate the need for future re-encoding of an entire image file, which is expensive, should further editing to add metadata be performed. Note that while FIG. 3 represents adding padding via the IFD metadata handler 340 upon re-encoding an image file the first time that re-encoding is performed, the padding may also be added during the first encoding of the file, that is, as part of image creation. In other words, an encode / IFD metadata handler 340 having a padding management mechanism 342 may be associated with the image creation application 346. However, by being operational during after creation and as part of re-encoding, the padding management mechanism 342 does not require the image creation application 346 to have such a capability. The padding management mechanism 342 thus can provide padding for images that were not initially padded, (as conventional image files are created without padding), as well as for those that were previously padded but need additional padding.

Figure 4:
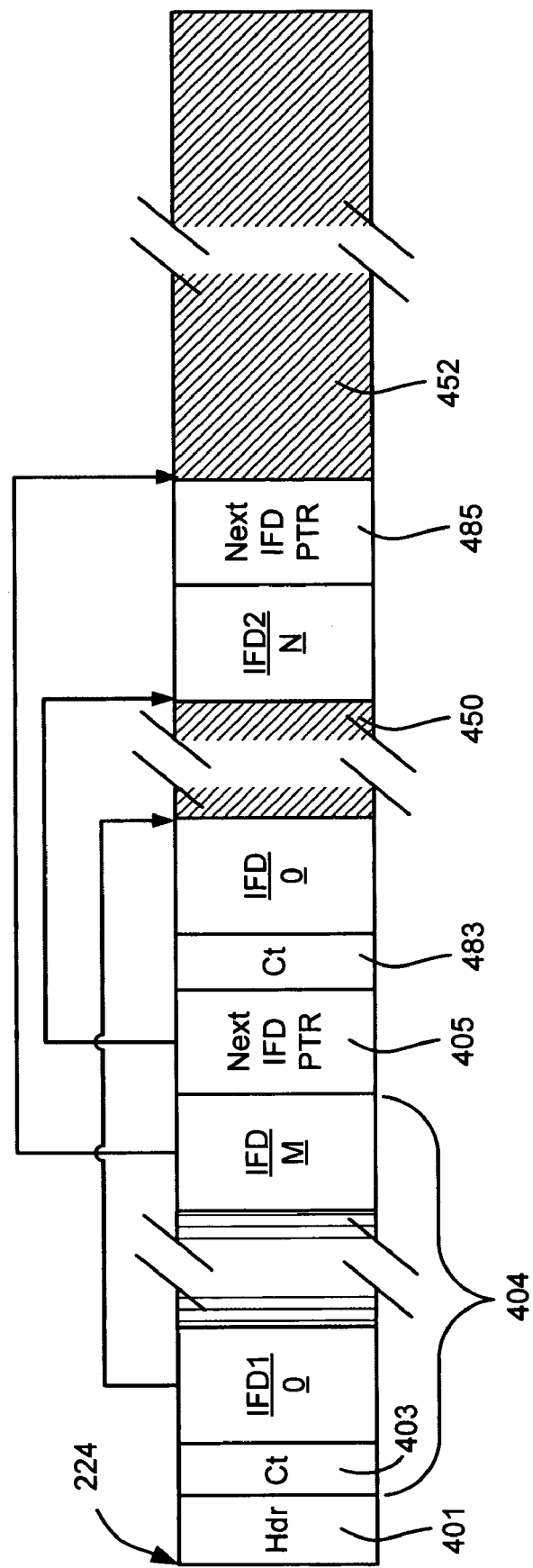
FIGS. 4 and 5 are example representations of an image file before and after padding, respectively.
Figure 5:
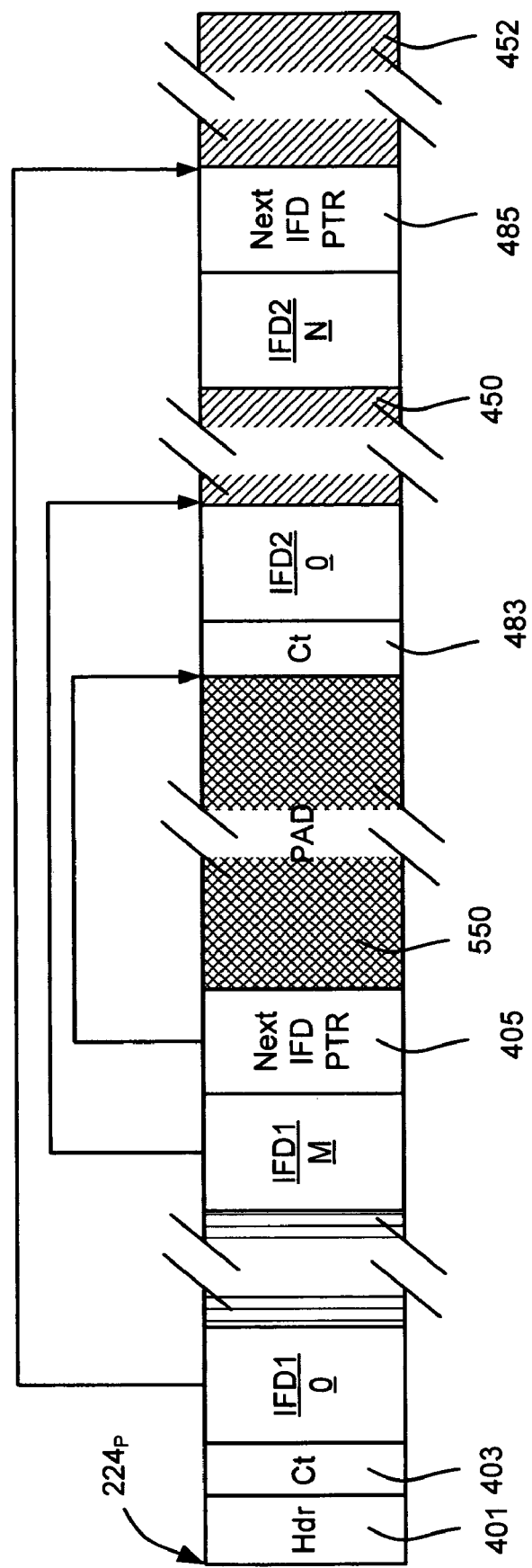

FIGS. 4 and 5 are representation of an (e.g., TIFF) Image file 224 before and after padding by the padding management mechanism 342. In general, following a header 401, there is an IFD directory that includes a field 403 for a count (Ct) of the number of IFD entries in the IFD directory. In the example of FIGS. 4 and 5, the first IFD, IFD1, has entries ranging from IFD1 0 to IFD1 M. In one implementation, each IFD entry includes twelve bytes for a tag identifier, a type, a size field and a offset pointer to the image data / metadata (regions 450 and 452 are shown being pointed at by the offset pointers for IFD1 entry 0 and IFD1 entry M. Note that in FIG.4, the set of fields / entries collectively labeled 404(ranging from the count CT field 403 to IFD1 M) is an example of an IFD.

Following the last IFD entry (IFD1 M in this example) is a pointer to the next IFD (or NULL if the last IFD in the image file). In the example of FIGS. 4 and 5, the second IFD, IFD2, is pointed to by the next IFD pointer in block 405, and ranges from IFD2 0 to IFD2 N. In turn, following the last entry is a field 485 containing a pointer to the next IFD, if any.

In keeping with the present invention, upon re-encoding, the padding management mechanism adds padding 550 to the image file as generally represented in FIG. 5. In one implementation, the padding 550 is added directly after an IFD, that is, following at least one of the next IFD pointer fields. In the example of FIG. 5, the padding 550 is shown as having been added following the next IFD pointer field 405.

In one implementation, padding may be on the order of four kilobytes, although other sizes of padding may be added as appropriate for a given situation. Also, to know whether there is padding or not present, a directory entry is added to refer to the padding area, with a unique padding tag identifier (e.g., 0xEA1C).

Figure 6:
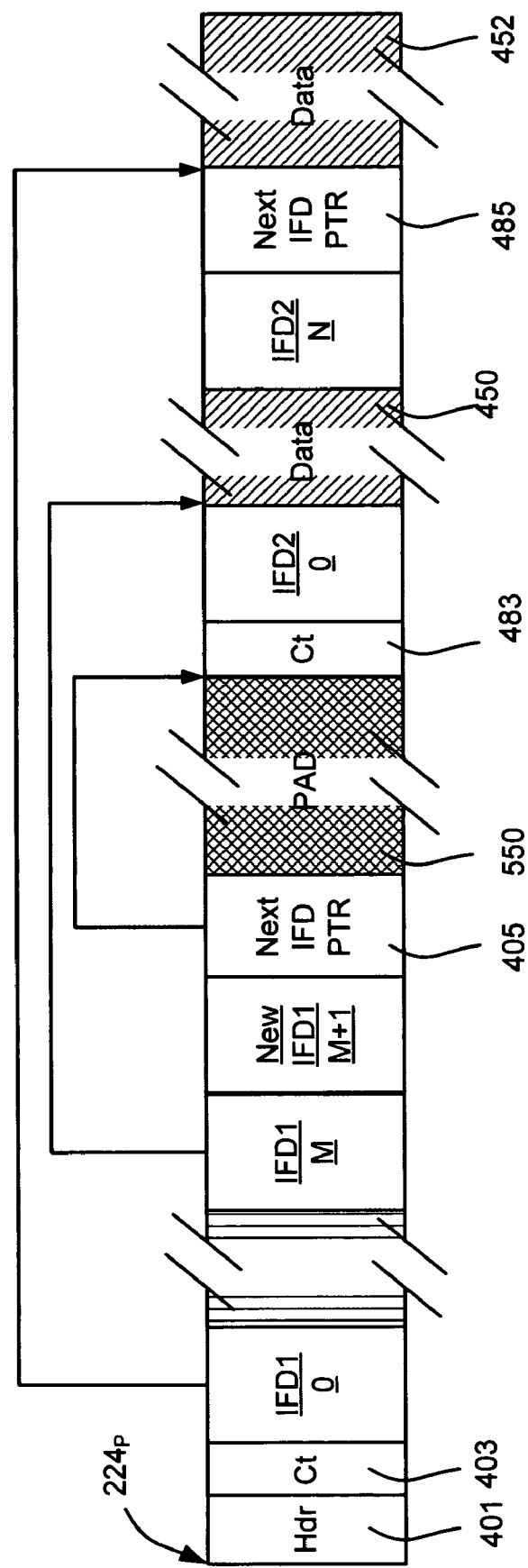
FIG. 6 is an example representation of an image file having a new directory entry added thereto by consuming some of the padded space.

Once the padding 550 has been added, this advantageously allows the preceding IFD (IFD1) to grow if necessary to add another entry or set of entries. This is generally represented in FIG. 6, where a new IFD entry (e.g., IFD1 M+1) or entries may be added by inserting them into the padding space that includes and follows the next IFD pointer 405. One way to accomplish this is simply to rewrite the entire (modified) IFD, part of which will now extend into what previously was added as padding. The padding space 550 becomes smaller upon such an added entry.

Figure 7:
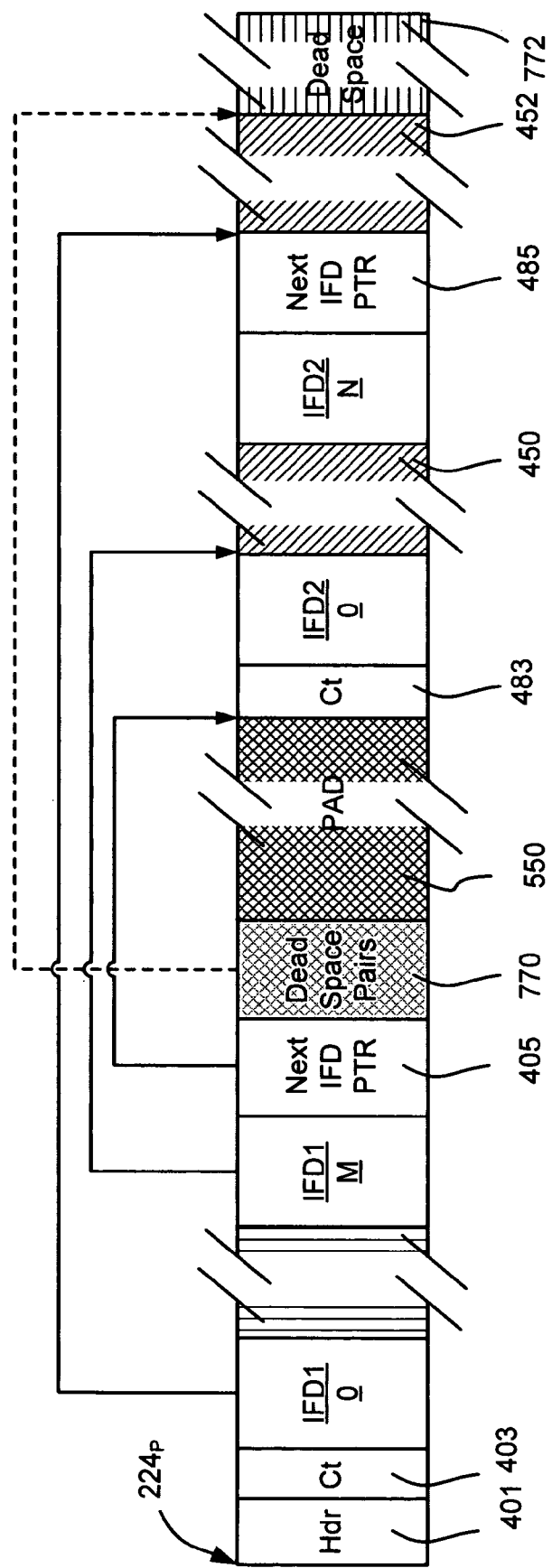
FIG. 7 is an example representation of an image file having dead space tracked within some of the padded space.

The padding 550 may be used for other purposes as well. For example, FIG. 7 shows the padding being used to track dead space, essentially a count of dead space regions followed by an <offset, size> pairing for each region of dead space, e.g., the dead space 772. As will be understood, via this information, metadata or other data may be added to dead space (e.g., space that was used but became freed for whatever reason, typically through user editing or removing of metadata items) when sufficient dead space is available, rather than to padded space.

Figure 8:
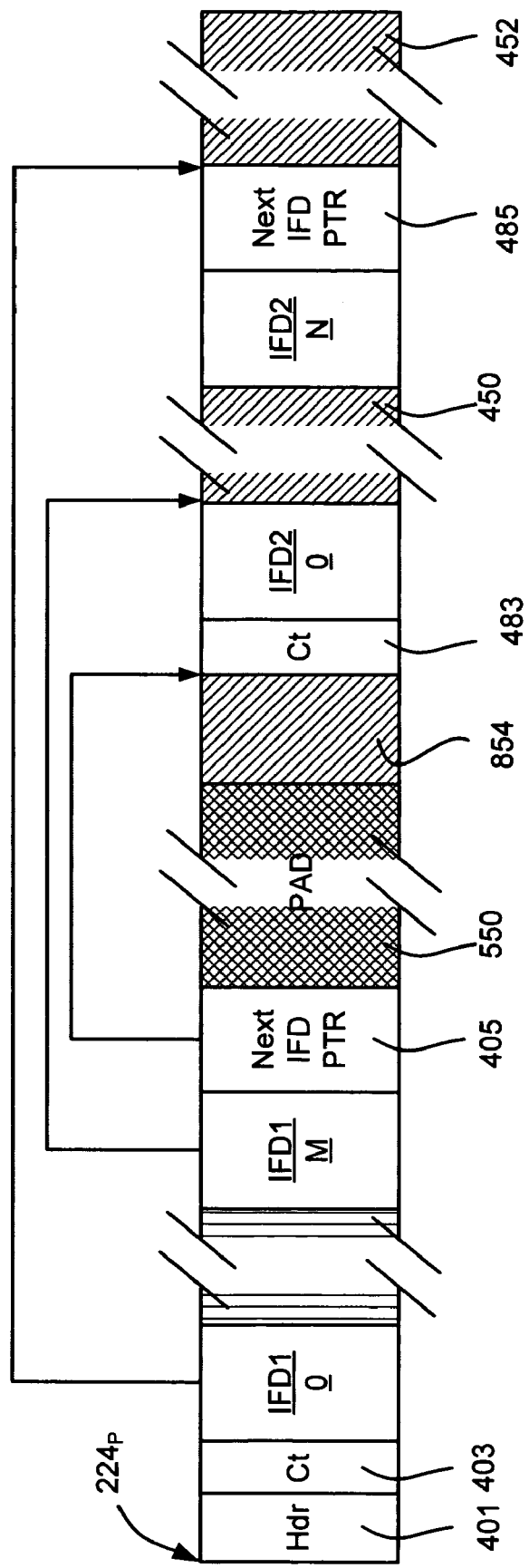
FIG. 8 is an example representation of an image file having some of its padded space consumed by the addition of metadata.

The padding also may be consumed by metadata, which in one implementation is consumed from the right (higher offset to lower offset) as represented from the perspective of FIG. 8 by the shaded block labeled 854. Note that this is because any new directory entries are added from the left (lower offsets to higher offsets), whereby the padding may shrink from both directions without the new entries and metadata overwriting each other.

Figure 9:
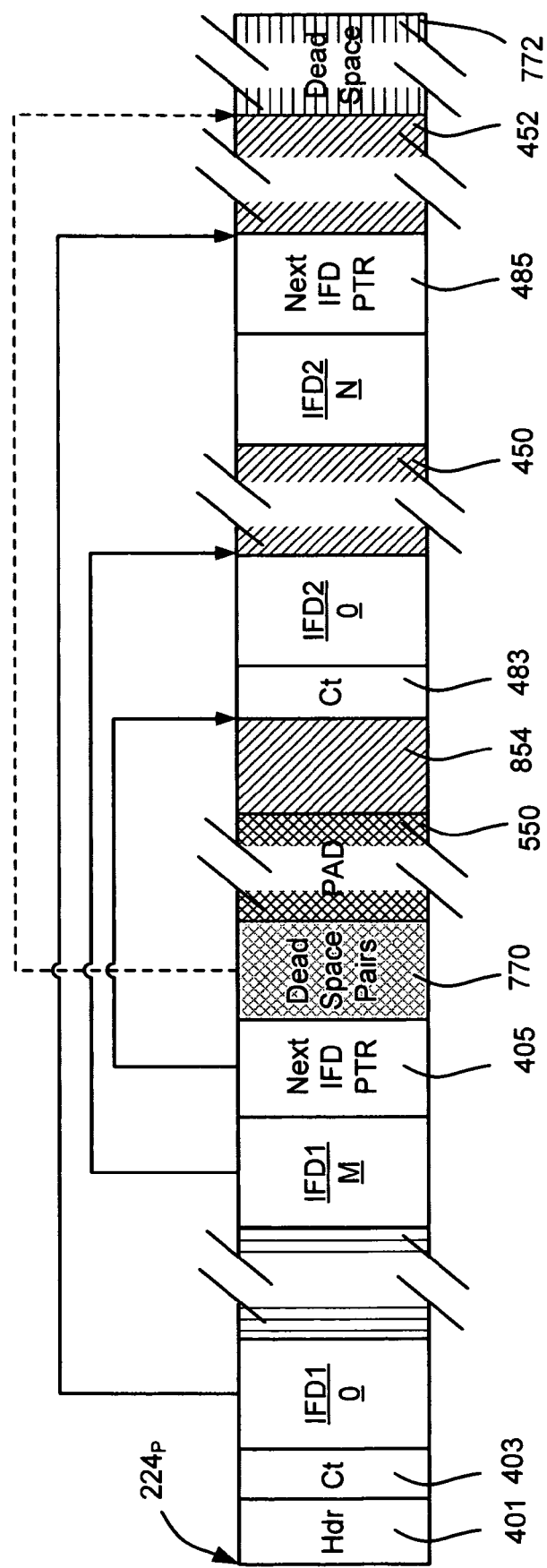
FIG. 9 is an example representation of an image file having some of its padded space consumed by the addition of metadata when insufficient dead space is available for adding the metadata.

FIG. 9 shows another state of the padded file, in which some of the initial padding has been consumed by dead space pairs and other of the initial padding has been consumed by added metadata 854. Note that dead space pairs can be pushed to the right if new IFD entries are added. Further note that as described below, if necessary, the dead space pairs can be overwritten with metadata. This concept is consistent with deferring re-encoding until necessary.

Figure 10:
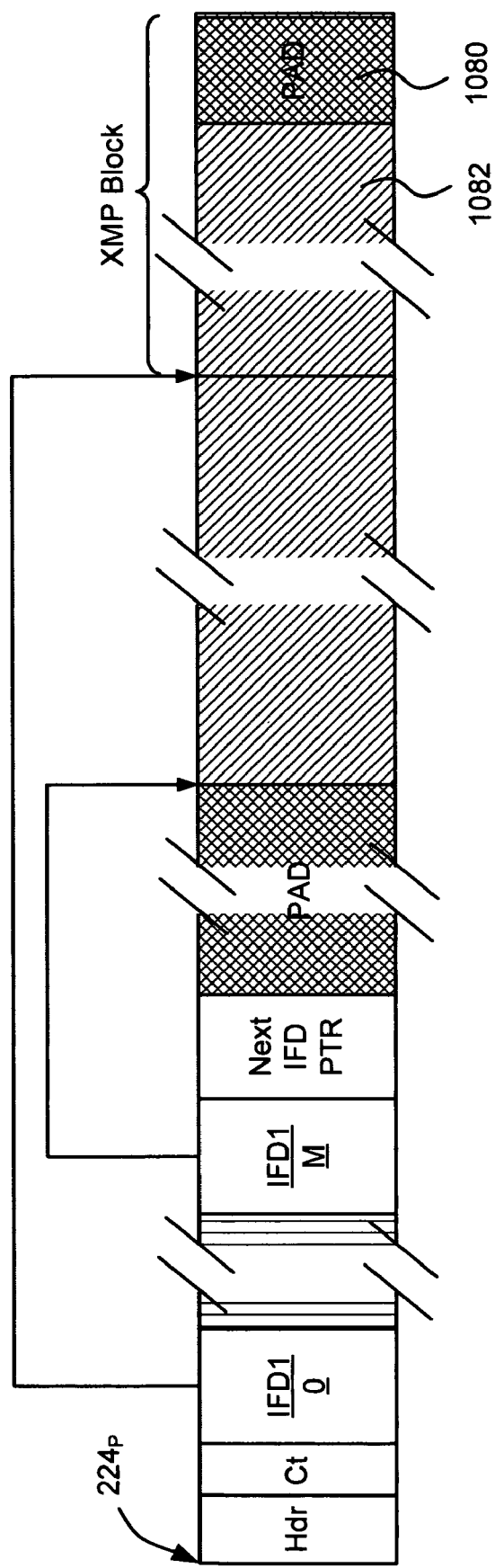
FIG. 10 is an example representation of an image file having some of its padded space added to an XMP data block.

Depending on the data format, padding can be added elsewhere in the image file if appropriate. For example, FIG. 10 shows an extensible hierarchical data format, XMP, within a TIFF image file, with padding 1080 added to an XMP block 1082 by an XMP metadata handler:

```
<?xpacket begin="" ... ?>
<xmp:xmpmeta ... >
    <dc:title> ... </ ... >
</xmp:xmpmeta>
```

```
                    -continued padding space 0x20
                          ...
                          ...
                   <?xpacket end="w"?>
```

As can be appreciated, by adding spaces (0x20) to the file, the padding space 1080 added to the XMP block 1082 allows the block 1082 to subsequently have metadata added thereto without needing to re-encode the file.

Figure 11:
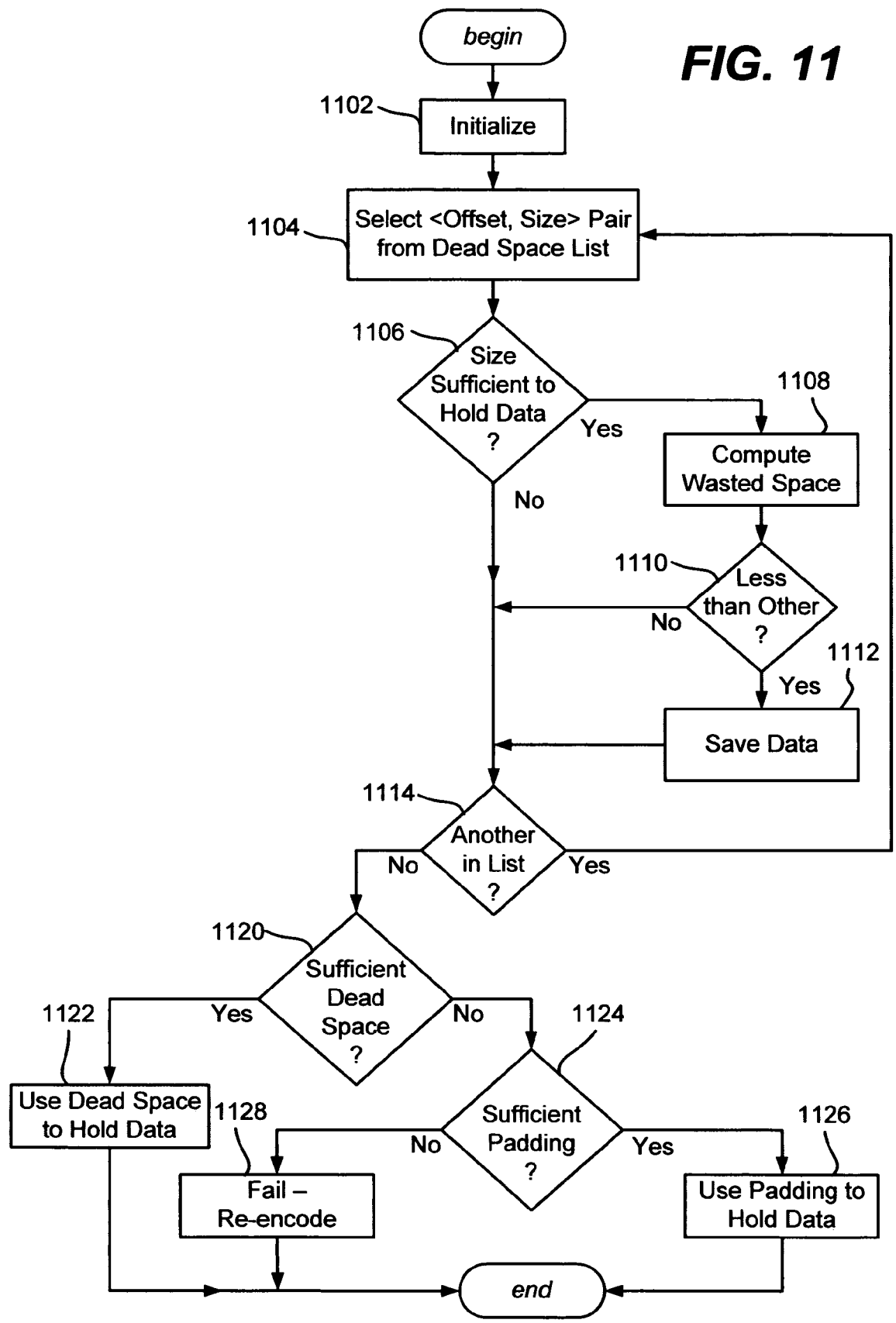
FIG. 11 is an example flow diagram for allocating space when handling the addition of metadata.

Turning to an explanation of the padding management mechanism 340 (FIG. 3), FIG. 11 shows general, example logic (e.g., performed by the padding management mechanism 340) when space needs to be allocated for metadata. Step 1102 represents performing any initialization, such as to set variables, e.g., to find the smallest amount of dead space to allocate, if any.

Step 1104 selects an <offset, size> pair from the dead space list, and step 1106 determines whether the size is sufficient to hold the amount of metadata to be written. If not, step 1106 advances to step 1114 to repeat the evaluation with the next <offset, size> pair until none remain.

If sufficient space is detected at step 1106, step 1108 computes how much space will be wasted if the dead space is used for the metadata. Essentially, steps 1108, 1110 and 1112 are directed towards finding the wasted space that if used, will result in the least amount of space being wasted. Thus, if less space is wasted at step 1110 than would be wasted with another <offset, size> pair, a new pair is saved at step 1112.

Step 1114 repeats the process until the list is exhausted. At this time, there was either no dead space that was sufficient, or the smallest amount of dead space that will hold the metadata has been located.

Step 1120 determines whether sufficient dead space was found, that is, at least one <offset, size> pair was located that can hold the metadata. If so, step 1122 represents writing the data to that dead space, and essentially removing the <offset, size> pair from the dead space list or adjusting it, e.g., if there is wasted space left over after adding the metadata item to the dead space, a new or adjusted <offset, size> for the remaining dead space is updated in the dead space list.

In the event that there was not sufficient dead space, step 1124 determines whether there is sufficient padding to hold the metadata. In one implementation, the padding is used even if using it results in the dead space list being overwritten. If sufficient padding exists, step 1126 represents writing the metadata to the padding region. Otherwise, the process failed to find sufficient space, and at step 1128 a re-encoding of the file needs to be performed.

Thus, to summarize, dead space is used first, if sufficient, with the dead space that results in the least amount of wasted space being selected for use. If no dead space is sufficient, the padding is evaluated to determine whether it can hold the metadata. Only if not is re-encoding performed.

Figure 12:
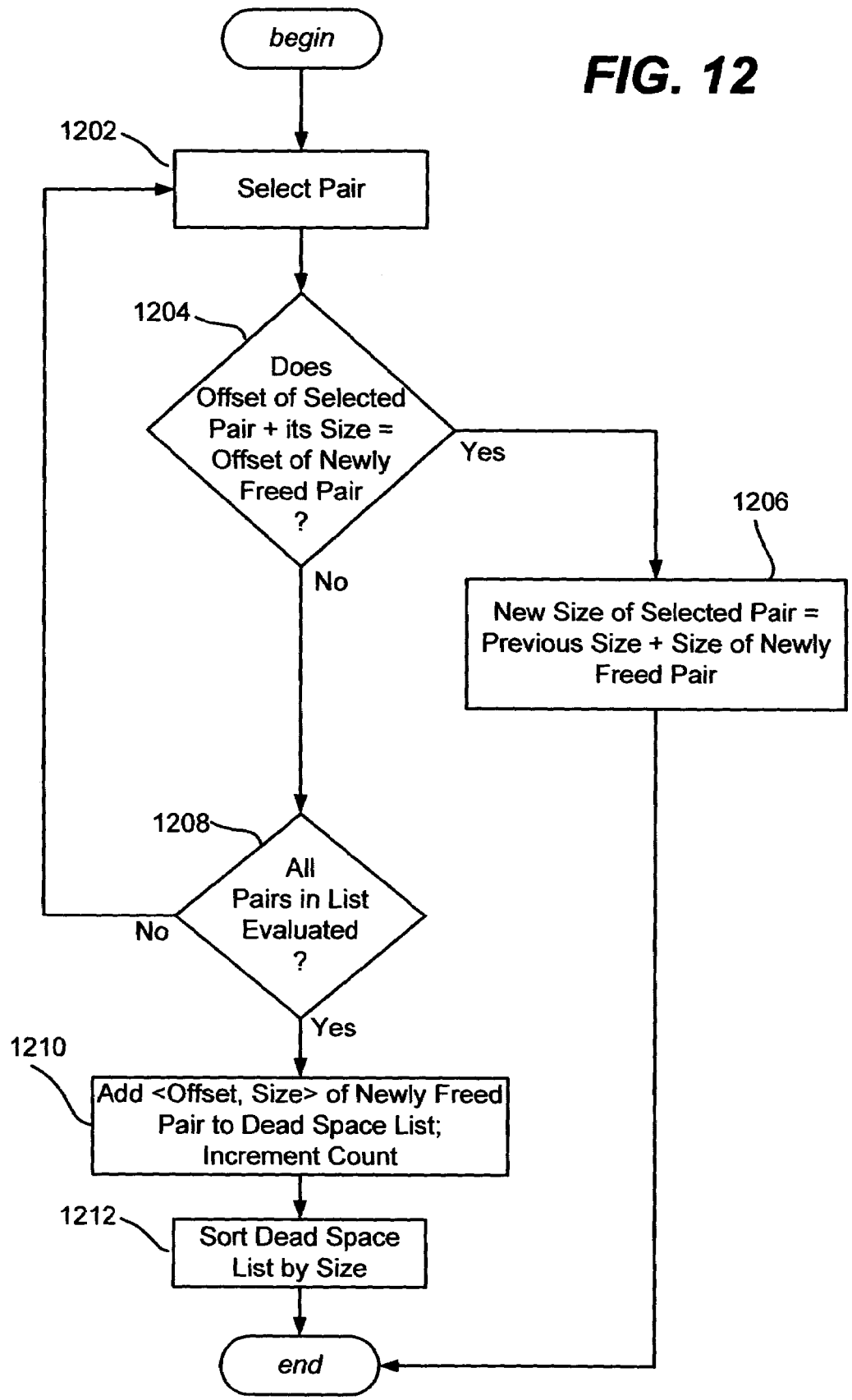
FIG. 12 is an example flow diagram for handling free space.

FIG. 12 represents example steps that may be taken when space is freed, that is, when space formerly used for holding metadata/image data (or even an IFD) becomes dead space, such as when a user deletes an IFD entry. To this end, an <offset, size> pair may be added to the list to identify the dead space, and the count of the number of pairs incremented. However, before adding the new pair, it is possible that this space is adjacent to other dead space, in which case the two dead spaces can be coalesced in to a single region of dead space. To this end, step 1202 selects a pair, e.g., starting from the left with the first pair, and step 1204 computes whether the selected pair and the newly deleted pair represent adjacent space, e.g., if the offset of the selected pair plus its size equals the offset of the newly deleted pair, then the two <offset, size> pairs represent adjacent space. If so, step 1206 increases the size of the selected pair by the size of the newly deleted pair, and the newly deleted pair essentially discarded. Note that there is also the converse situation where dead space may follow the newly freed space, which is essentially equivalent, whereby similar processing coalesces the two adjacent spaces into one.

If not, step 1208 repeats the process until all pairs in the list have been selected and evaluated. If no existing pair represents adjacent space to that of the newly deleted pair, step 1210 adds the newly deleted pair to the dead space list and increments the count. Note that the pairs may be sorted by size (step 1212), e.g., so that smaller-sized dead space pairs tracked in the padding will be overwritten, if necessary, before larger-sized pairs.

It is possible that following significant editing, the file may become fragmented with padding, dead space, deleted entries and so forth. While it is feasible to have a defragmentation utility as part of a metadata handler, a more straightforward way to handle such a situation is to simply re-encode the file. Padding is added to the re-encoded file, essentially starting over with a defragmented, padded file.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer-readable storage medium having stored computer-executable instructions, which when executed perform a method for adding padding to a content file upon re-encoding the content file such that the re-encoded content file contains sufficient padding to subsequently add metadata without requiring a subsequent re-encoding, the method, comprising:
   obtaining metadata to add to a content file;
   evaluating the content file to determine whether a sufficient dead space region exists in the content file to hold the metadata,
      wherein when it is determined that a sufficient dead space region exists, the metadata is written to dead space region, and
      wherein when it is determined that a sufficient dead space region does not exist in the content file, the method includes evaluting the content file to determine whether a sufficient padding region exists in the content file to hold the metadata,
         wherein when it is determined that a sufficient padding region exists, the metadata is written to the padding region, and
         wherein when it is determined that a sufficient padding region does not exists in the content file, the method includes adding padding to the content file and writing the metadata to the added padding region and upon adding the padding to the content file, re-encoding the content file, wherein the re-encoded content file contains sufficient padding for subsequent additions of metadata.

2. The computer-readable storage medium of claim 1 wherein the content file comprises an image file having an image file directory, and wherein adding the padding to the content file comprises adding the padding directly after the image file directory.

3. The computer-readable storage medium of claim 2 having further stored computer-executable instructions comprising, adding a directory entry to the image file directory such that part of the image file directory extends into a location that was formerly part of the padding.

4. The computer-readable storage medium of claim 2 having further stored computer-executable instructions comprising, adding at least one indentifier of dead space to a location that was formerly part of the padding.

5. The computer-readable storage medium of claim 1 having further stored computer-executable instructions comprising, coalescing adjacent regions of dead space into a single region of dead space.

6. The computer-readable storage medium of claim 1 wherein the re-encoded content file is written to persistent storage.

7. In a computing environment comprising at least one computer system, a method for adding padding to a content file upon re-encoding the content file such that the re-encoded content file contains sufficient padding to subsequently add metadata without requiring a subsequent re-encoding, the method comprising:
  obtaining metadta to add to an image file;
  evaluating the image file to determine whether a sufficient dead space region exists in the image file to hold the metadata, such that if a sufficient dead space region exists, the metadata is written region;
  upon determining that a sufficient dead space region does not exists in the image file, evaluating the image file to determine whether a sufficient padding region exists in the image file to hold the metadata, such that if a sufficient padding region exists, the metadata is written to the padding region;
  only upon determining that a sufficient padding region does not exists in the image file, adding padding to the image file and writing the metadata to the added padding region; and
  upon adding the padding to the image file, re-encoding the image file, wherein the re-encoded image file contains sufficient padding for subsequent additions of metadata.

8. The method of claim 7 wherein evaluating the image file to determine whether a sufficient dead space region exists comprises, evaluating data that tracks dead space in the image file.

9. The method of claim 8 wherein evaluating the data that tracks the dead space comprises evaluating offset, size pairs.

10. The method of claim 8 wherein evaluating the data that tracks the dead space determines that at least one region of sufficient dead space exists, and further comprising, selecting a region for adding the metadata that when used, wastes a least amount of space.

11. The method of claim 7 wherein the image file contains an image file directory directly before the padding region, and further comprising, addinga directory entry to the image file directory such that part of the image file directory extends into a locatins that was formerly part of the padding region.

12. The method of claim 7 further comprising, coalescing adjacent regions of dead space into a single region of dead space.

13. The method of claim 7 wherein the re-encoded image file is written to persirent storage.

14. In a computing environment, a system having a processor coupled to a memory, the system further comprising:
  a metadata handler component that process an image file;
  means for saving the padded image file to a persirent storage; and
  a padding management component coupled to the metadata handler component, wherein the padding management component, in response to a request to write metadata to the image file, performs a method for adding padding to a content file upon re-encoding the content file such that re-encoded content file contains sufficient padding to subsequently add metadata without requiring a subsequent re-encoding ,the method comprising:
    obtaining metadata to add to a content file;
    evaluating the image file to determine whether a sufficient dead space region exists in the image file to hold the metadata, such that if a sufficient dead space exists, the metadata is written to the dead space region;
    upon determine that a sufficient padding region does not exists in the image file, evaluating the image file to determine whether a sufficient padding region exists in the image file to hold the metadata, such that if a sufficient padding region exists, the metadata is written to the padding region;
    upon determining that a sufficient padding region does not exists in the image file, adding padding to the image file and writing the metadata to the added padding region; and
    upon adding the padding to the image file, re-encoding the image file, wherein the re-encoded image file contains sufficient padding for subsequent additions of metadata.

15. The system of claim 14 further comprising, means for opening the padded image file, and wherein the padding management component adds metadata to a location corresponding to the padding.

16. The system of claim 14 further comprising, means for opening the padded image file, and wherein the padding management component adds an image file directory entry to a location corresponding to the padding.

17. The system of claim 14 further comprising, means foropening the padded image file, and wherein the padding management component tracks dead space in the padded image file in a location corresponding to the padding.

18. The system of claim 14 wherein the padding management component includes logic that coalesces adjacent dead space regions in to a single dead space region.

* * * * *